United States Patent
Dubach

[15] 3,678,142
[45] July 18, 1972

[54] PROCESS FOR PERMANENTLY CRIMPING YARN AND THE LIKE

[72] Inventor: Paul Dubach, Hochhaus II, Wattwil, Switzerland

[22] Filed: June 25, 1970

[21] Appl. No.: 56,058

Related U.S. Application Data

[63] Continuation of Ser. No. 714,746, March 20, 1968, abandoned.

[30] Foreign Application Priority Data

March 28, 1967 Switzerland ............................ 4319/67

[52] U.S. Cl. ................................. 264/25, 28/72.1, 264/168, 264/282
[51] Int. Cl. ........................................................... D02g 1/00
[58] Field of Search ............... 264/22, 25, 168, 282; 28/72.1, 28/72.11

[56] References Cited

UNITED STATES PATENTS

| | | | |
|---|---|---|---|
| 3,081,485 | 3/1963 | Steigerwald | 264/25 X |
| 3,292,270 | 12/1966 | Spunt | 34/1 |
| 3,343,207 | 9/1967 | Mottern | 18/1 |
| 3,374,302 | 3/1968 | Stanley | 264/168 |
| 3,396,216 | 8/1968 | Yumoto | 264/25 |
| 3,479,709 | 11/1969 | Daniel | 28/72.1 |
| 3,523,345 | 8/1970 | Hughes | 264/168 X |

*Primary Examiner*—Robert F. White
*Assistant Examiner*—Richard R. Kucia
*Attorney*—Ward, McElhannon, Brooks & Fitzpatrick

[57] ABSTRACT

The beam from a laser is caused to traverse either continuously or periodically along the length of a filament, thread, yarn, ribbon, or the like, while the same is under tension. The arrangement is such as to develop a temperature gradient through the element in a transverse direction relative to its longitudinal axis, wherever the laser beam impinges, for developing differential relaxation of stresses therein and to impart a crimp thereto.

12 Claims, 8 Drawing Figures

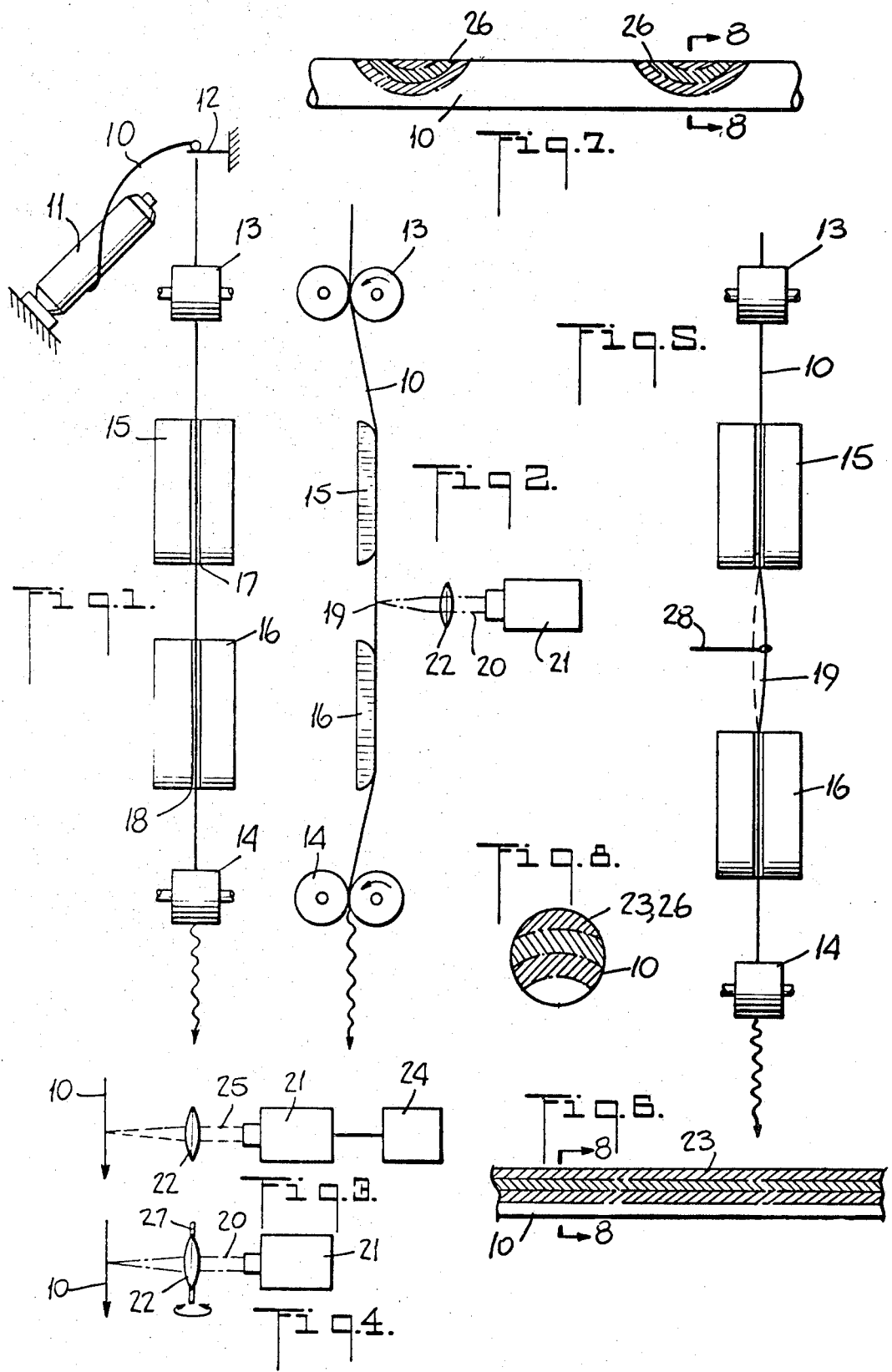

PROCESS FOR PERMANENTLY CRIMPING YARN AND THE LIKE

This is a continuation of application, Ser. No. 714,746 filed Mar. 20, 1968, now abandoned.

The present invention relates to a process for imparting a permanent crimp to thermoplastic thread-like or ribbon-like elements.

As used herein, it is to be understood that the reference to "thread-like" or "ribbon-like" elements (for convenience, shortened to "elements") encompasses monofilaments, threads, yarns, strands, and ribbons, or the like.

Processes are known for permanently crimping elements consisting of thermoplastic materials. In one known method an element is subjected to stretching and subsequently heated in the stretched state so that a temperature gradient is developed across the element. Thereafter the element is cooled and the tension is removed. Eventually, it is submitted to a further heat treatment in the relaxed state. In the known method, the temperature gradient is created by bringing one side of the element into contact with a heated surface. The disadvantage of this method resides in the fact that the amount of heat that can be transferred from the heated surface to the element is limited. Consequently, there is also a limitation on the speed with which the element can be caused to traverse the heated surface.

In another known process, the temperature gradient is created by means of a gaseous or fluid medium which is projected in a direction normal to the longitudinal axis of the element. An example is an oxy-acetylene flame which produces high heat energy across the element. However, this last mentioned process requires, in practical application, relatively complicated and expensive equipment.

It is an object of the present invention to provide a process and apparatus for developing the temperature gradient in the element in a manner avoiding the foregoing disadvantages.

In accordance with one aspect of the invention there is provided a process for permanently crimping a pre-stressed element selected from the class consisting of monofilaments, threads, yarns, strands, and ribbons composed, at least in part, of thermoplastic material, the process comprising the steps of generating a concentrated beam of coherent monochromatic light, producing tension in at least a zone of said element, and causing said beam to impinge upon said element within said zone to develop a temperature gradient therethrough in a transverse direction relative to the longitudinal axis thereof to develop therein differential relaxation of stresses.

In accordance with a further aspect of the invention, there is described apparatus for use in permanently crimping the elements which comprises, in combination, means for producing a laser beam, means for propelling said elements longitudinally and under tension through a treating zone, and means for causing the beam from said beam producing means to intercept at least intermittently the path of said elements.

The elements referred to herein may consist entirely or partly of thermoplastic synthetic materials, such as, for example, polyamides, e.g., poly (N-hexamethyleneadipamide) (polyamide 66 resins), condensation products of epsilon-aminocaproic acid (polyamide 6 resins), or poly (11-aminoundecanoicamide) (polyamide 11 resins); polyesters, e.g., poly (ethylene terrephthalate); materials on a vinyl base as polyacrylonitrile resins; polyolefines; or cellulose acetate.

The invention will be better understood after reading the following detailed description of several preferred embodiments thereof with reference to the accompanying drawings in which:

FIG. 1 is a plan view, somewhat schematic of one form of apparatus for crimping elements in accordance with the present invention;

FIG. 2 is a side view of the apparatus of FIG. 1;

FIG. 3 is a diagrammatic representation of a modification of the equipment of FIG. 1;

FIG. 4 is a diagrammatic representation of a still further modification of the invention;

FIG. 5 is a view similar to FIG. 1 showing a further embodiment of the invention;

FIG. 6 is a schematic representation of the temperature gradient in an element produced by the equipment shown in FIGS. 1 and 2;

FIG. 7 is a view similar to FIG. 6 showing the temperature gradient produced in an element by the equipment of FIGS. 3, 4, or 5; and FIG. 8 is a schematic sectional view taken along line 8—8 in both FIGS. 6 and 7.

Throughout the several Figures of the drawing the same reference numerals are used to designate the same or similar part.

For convenience in the description of the apparatus of FIGS. 1 and 2, to which attention is now directed, reference will be made to the crimping of yarn. It is to be understood, however, that any of the other elements may be crimped in similar manner.

Raw yarn 10 is drawn from a delivery or supply package or bobbin 11 through a guide member 12 by means of a pair of drive rollers 13. Another pair of rollers 14, arranged to rotate at a slightly greater circumferential speed than the pair of rollers 13, draws the yarn 10 over the two plates 15 and 16 under tension. The plates 15 and 16 are provided with guide grooves 17 and 18, respectively, for steadying the yarn as it passes between the roller pairs 13 and 14. The plate 15 is arranged to be heated to a temperature of approximately 70° C. in order to preheat the yarn. The plate 16 is supplied on its interior by means not shown with a cooling medium for cooling the yarn. At the point designated by the reference numeral 19, the yarn 10 is heated from one side by means of the laser beam 20. After the yarn passes the point 19, it is cooled by contact with the plate 16, drawn through the pair of rollers 14, and wound in slack condition by means not shown. Alternatively, the yarn can be subjected to a further heat treatment by means, not shown, in order to develop the crimp further.

The laser beam 20 is produced by a laser generator 21 and focused by a lens assembly 22 so as to concentrate sufficient energy on the yarn at the point 19 to develop the required sharp temperature gradient thereat. As best seen in FIG. 2, the laser 21 is arranged to radiate continually. The beam 20 impinges upon and traverses the entire length of the yarn so as to produce a heated zone as indicated diagrammatically by the reference numeral 23 in FIG. 6. As shown in FIG. 6 the temperature varies from a very high level near the surface of the yarn to a lower level on the interior of the yarn. This temperature gradient is indicated schematically by the varying density of the cross-hatching. While the cross-hatching is in discrete layers, it is to be understood that the temperature gradient will be continuous and gradual without abrupt changes.

FIG. 3 illustrates a modification of the arrangement described with reference to FIGS. 1 and 2. As seen in FIG. 3, modulator means 24 is coupled to the laser generator 21 for pulse modulating the beam produced thereby. The pulse or intermittent beam is indicated by the reference numeral 25. Since this beam impinges intermittently upon the yarn 10, it will create heated zones 26 (best seen in FIG. 7) spaced longitudinally along the yarn 10 at distances determined by the yarn speed and the modulation frequency or pulse rate of the modulator 24.

Another embodiment is shown in FIG. 4 to which attention should now be directed. As shown therein, the focused beam 20 from the laser generator 21 is oscillated back and forth across the path of the yarn 10 by oscillating the lens system 22 about its axis 27. Oscillation of the lens system may be obtained by an electromagnetically excited oscillator connected with the lens system 22, but not shown in the drawings. Assuming that the yarn is moving in the plane of the paper and that the lens system is oscillated about an axis also in the plane of the paper, it will be understood that the beam will oscillate in a plane at right angles to or normal to the plane of the paper.

Alternatively, spaced heated zones can be obtained by the apparatus shown in FIG. 5. The yarn 10 to be crimped is caused to pass through a reciprocal yarn guide 28 for moving the yarn laterally back and forth across the path of the laser beam which passes through the point 19. This reciprocation occurs while the yarn is traveling longitudinally. The thread guide 28 may be connected to an electromagnetically excited oscillator, not shown.

The character of the crimp can be adjusted to provide the desired textile properties by controlling the rate of feed of the yarn through the apparatus along with the pulse rate or frequency of the modulator 24 in FIG. 3, the rate of reciprocation of the lens 22 in FIG. 4, or the rate of reciprocation of the yarn guide 28 in FIG. 5. In this manner, the spacing between the heated zones 26 can be controlled.

It is also contemplated that the yarn may be rotated around its own axis while being subjected to the action of the laser beam. Furthermore, a false-twist spindle or mechanism rotating at a relatively low speed may be placed between the plate 16 and the pair of rollers 14. By this means a slight false-twist can be imparted to the yarn between the pairs of rollers 13 and 14. The yarn 10, therefore, rotates around its own axis at the point 19 so that the continuously heated zone 23 or the discontinuously or intermittently heated zones 26 run in a helical or screw-like line around the length of the yarn.

The synthetic yarns employed in the apparatus of the present invention may, if desired, be subjected to preliminary partial cold stretching in order to impart a degree of molecular orientation to the molecules therein. Additional cold drawing may be imparted to the yarns during or after treatment with the laser beam.

In order to further develop the crimp, the yarns may be submitted to heat treatment, for example, steaming or hot air treatment under little or no tension after production of the temperature gradient therein.

In summary, it will be seen that the subject invention may be practiced by employing: a radiation source or laser beam which operates continually; a pulsed or intermittent laser beam or source; a laser beam operating continually but oscillated to and fro across the path of the yarn; or an arrangement for oscillating the yarn to and fro across the path of the laser beam.

The invention has been described with reference to certain presently preferred embodiments thereof. It will be understood by those skilled in the art to which the invention pertains that various changes may be made therein without departing from the true spirit of the invention as defined in the appended claims.

What is claimed is:

1. A process for permanently crimping an element selected from the class consisting of monofilaments, threads, yarns, strands, and ribbons composed, at least in part, of thermoplastic material, said process comprising the steps of generating a concentrated beam of coherent monochromatic light, producing longitudinal tension in at least a zone of said element, causing said beam to impinge upon said element in a transverse direction thereof within said zone only long enough to develop a temperature gradient therethrough in said transverse direction relative to the longitudinal axis thereof to develop therein transversely of said element differential relaxation of longitudinal stresses and thereafter removing said longitudinal tension from said element.

2. A process according to claim 1, wherein said beam is generated continually.

3. A process according to claim 2, wherein said element is propelled longitudinally and under tension across the path of said beam causing the point of impingement of said beam to travel in a continuous manner along the length of said element.

4. A process according to claim 2, wherein said element is propelled both longitudinally and laterally and under tension to periodically intercept the path of said beam to create said temperature gradient at zones spaced apart along the length of the element.

5. A process according to claim 2, wherein said element is propelled in a longitudinal direction and under tension while said beam is oscillated back and forth across the path of said element to periodically impinge upon said element and create said temperature gradient at zones spaced apart along the length of the element.

6. A process according to claim 1, wherein said beam is generated intermittently while said element is propelled longitudinally and under tension across its path to create said temperature gradient at zones spaced apart along the length of the element.

7. A process according to claim 1, further comprising the step of heating said element before causing said beam to impinge thereon.

8. A process according to claim 7, further comprising the step of cooling said element after causing said beam to impinge thereon.

9. A process according to claim 1, further comprising the step of cooling said element after causing said beam to impinge thereon.

10. A process according to claim 1, further comprising the step of rotating said element about its axis as said beam is caused to impinge thereon.

11. A process according to claim 1, further comprising the step of subjecting the element to a subsequent heat treatment after developing said differential relaxation of stresses.

12. A process according to claim 1, wherein said element is selected having a degree of molecular orientation due to partial cold stretching and is subjected to additional cold drawing during or after causing said beam to impinge thereon.

* * * * *